United States Patent [19]

Dalton

[11] Patent Number: 6,015,855
[45] Date of Patent: Jan. 18, 2000

[54] PAINT FORMULATIONS

[75] Inventor: William M. Dalton, Moberly, Mo.

[73] Assignee: Elisha Technologies Co LLC, Moberly, Mo.

[21] Appl. No.: 09/016,497

[22] Filed: Jan. 30, 1998

Related U.S. Application Data

[60] Provisional application No. 60/036,025, Jan. 31, 1997, and provisional application No. 60/045,465, May 2, 1997.

[51] Int. Cl.$^7$ .............................. C08K 3/34; C08K 11/00; C08L 63/00
[52] U.S. Cl. ......................... 524/442; 524/444; 524/456; 524/492; 524/493; 524/494; 523/443
[58] Field of Search .................................. 524/442, 444, 524/456, 492, 493, 494; 523/443, 442

[56] References Cited

U.S. PATENT DOCUMENTS

| | | | |
|---|---|---|---|
| 5,324,346 | 6/1994 | Morgan et al. | 106/14.05 |
| 5,504,045 | 4/1996 | Emlemdi | 501/16 |
| 5,714,093 | 2/1998 | Heimann et al. | 252/389.62 |
| 5,743,971 | 4/1998 | Inoue et al. | 148/247 |

FOREIGN PATENT DOCUMENTS 2 301 597  12/1996  United Kingdom .

*Primary Examiner*—James J. Seidleck
*Assistant Examiner*—U. K. Rajguru
*Attorney, Agent, or Firm*—Michael K. Boyer

[57] ABSTRACT

The disclosure relates to improved formulations for paints and coatings. The improved paints and coatings can impart improved corrosion resistance in comparison to conventional paints. In addition to providing an environmental barrier, an alkali silicate component of the paint interacts or reacts with the surface of an underlying metal surface and forms a corrosion resistant mineral like product.

23 Claims, No Drawings

PAINT FORMULATIONS

The subject matter of the instant invention claims benefit under 35 U.S.C. 111 (a), 35 U.S.C. 119(e) and 35 U.S.C. 120 of prior filed U.S. Provisional Patent Application Serial No. 60/036,025 (Attorney Docket No. EL009WD-P), filed on Jan. 31, 1997, and Ser. No. 60/045,465, filed on May 2, 1997 both of which are entitled "Improved Paint Formulations"

FIELD OF THE INVENTION

The instant invention relates to improved formulations for paints and coatings. The improved paints and coatings can impart improved corrosion resistance in comparison to conventional paints.

BACKGROUND OF THE INVENTION

The corrosion of steel and other metal containing products continues to be a serious technical problem which has profound effects on the economy. Corrosion causes loss of natural resources, and deteriorates key infrastructure such as roads and buildings. It also causes premature replacement of equipment and parts in industrial facilities, boats and other marine vehicles, automobiles, aircraft, among a wide range of metallic components.

Current industry standards for corrosion prevention center around the use of barrier coatings, sacrificial coatings, alloys containing heavy metals such as chromium, nickel, lead, cadmium, copper, mercury, barium, among other heavy metals. The introduction of these materials into the environment, however, can lead to serious health consequences as well as substantial costs to contain or separate the materials or clean up environmental contamination. Damage associated with corrosion, accordingly, is a continuing problem and better systems for preventing corrosion are still needed.

In many applications, corrosion of metals is reduced by applying a paint or coating which functions as a barrier from the corrosive environment. Conventional paints and coatings fail to provide long term protection to metals; especially if the paint or coating is somehow breached, e.g., by a scratch or dent.

SUMMARY OF THE INVENTION

The instant invention relates to improved formulations for paints and coatings. The improved paints and coatings can impart improved corrosion resistance in comparison to conventional paints.

The instant improved paint formulations solve problems associated with conventional paint formulations by providing a paint formulation which can form a mineralized layer upon a metal surface. That is, the improved paint formulations serve to deliver reactants to the metal surface in addition to forming a conventional barrier layer. The mineral coated metal surface can thereafter be further processed in accordance with conventional methods.

CROSS-REFERENCE TO RELATED PATENTS AND PATENT APPLICATIONS

The subject matter of the instant invention is related to copending and commonly assigned Non-Provisional U.S. Patent Application Ser. No. 09/016,853(Attorney Docket No. EL001RH-8, filed on even date herewith), Nos. 08/850, 323 and 08/850,586 (EL001RH-6 and EL001RH-7 filed on May 2, 1997), and 08/791,337 and 08/791,336 (Attorney Docket Nos. EL001RH-4 and EL001RH-5 filed on Jan. 31, 1997) in the names of Robert L. Heimann et al., as a continuation in part of Ser. No. 08/634,215 (Attorney Docket No. EL001RH-3 filed on Apr. 18, 1996) in the names of Robert L. Heimann et al., and entitled "Corrosion Resistant Buffer System for Metal Products", which is a continuation in part of Non-Provisional U.S Patent Application Ser. No. 08/476,271 (Attorney Docket No. EL001RH-2 filed on Jun. 7, 1995) in the names of Heimann et al., and corresponding to WIPO Patent Application Publication No. WO 96/12770, which in turn is a continuation in part of Non-Provisional U.S. Patent Application Ser. No. 08/327,438, now allowed (Attorney Docket No. EL001 RH-1 filed on Oct. 21, 1994).

The subject matter of this application is also related to commonly assigned and copending Non-Provisional Patent Application Ser. No. 09/09/016,849 (Attorney Docket No. EL004RH-1), and filed on even date herewith and entitled "Corrosion Protective Coatings".

The disclosure of the previously identified patent applications and publication is hereby incorporated by reference.

DETAILED DESCRIPTION

The instant invention relates broadly to improved paint formulations and uses thereof to impart improved properties to the underlying surface. Such improved properties include corrosion resistance, among other valuable properties.

The improved paint formulations solve problems associated with conventional paint formulations by providing a paint formulation which can form a mineralized layer upon a metal surface. That is, the improved paint formulations serve to deliver reactants to the metal surface in addition to forming a conventional barrier layer. Broadly, the paint formulations contain an amount of an alkali silicate that is sufficient to react with at least a portion of the metal surface. For example, a sodium silicate containing urethane formulation that contacts a zinc or galvanized surface forms a zinc silicate mineral. By "mineral" or "mineralized" it is meant a composition containing at least one memeber selected from the group of oxygenated cations and anions wherein at least a portion of the mineral corresponds to an amorphous phase or matrix that embeds or surrounds an inorganic complex oxide crystal. Normally, the amorphous phase is the predominate phase component of the mineralized layer and, in some cases, substantially transparent to visible light. This type of predominately amorphous structure is characterized by continuous random network (CRN). In general, the mineral layer has a network structure in which metal atoms are bound to oxygen atorns by predominantly covalent bonds. The CRN or network can be modified by the introduction of metal oxides which are, in many embodiments of the invention, contributed by the substrate. By "metel containing surface", "substrate", or "surface" it is meant to refer to a metallic article and any metal containing surface as well as any substrate at least partially coated with a metal layer, film or foil including a non-metallic article having a metal layer. A wide variety of substances can be employed as precursors of the mineralized layer, such as one or more cations of the metals of Groups I, II and III, and the transition metals, of the Periodic Chart of the Elemnents. Additionally, one or more of the anions selected from the group consisting of water soluble salts and/or oxides of tungsten, molybdenum, chromium, titaniunm, zircon, vanadium, phosphorus, aluminum, iron, boron, bismuth, gallium, tellurium, germanium, antimony, niobium (also known as columbium), magnesium and manganese, mixtures thereof, amnong others. Particularly desirable results can be obtained by using salts and oxides of silicon, aluminum and iron.

At least a portion of the resulting mineralized layer having oxide network attributes can be characterized by the following fomula:

$$A_xB_yO_z\text{-}nH_2O$$

where A is termed a modifier cation and may be one or more ions selected from Group I, II and/or III metals, and B is a network forming cation, such as silicon, aluminum, iron or magnesium. The values of x and y can be any number except zero but x and y cannot all concurrently be zero and z cannot be zero. "z" can have any value ranging from y to $4_y$. "n" is water of hydration and has a value of from about 0 to about 10. The relationships of x, y, and z follow rules by Zachaiiascn in the Journal of the American Chemical Society, Volume 54, page 3841 (1932); hereby incorporated by reference:

1). A high proportion of (network-forming cations are surrounded by oxygen tetrahedra or triangles.
2). The oxygen polyhedra only share corners with each other.
3) Some oxygen atoms are linked to only two cations, and do not form additional bonds with any other cations.

In one aspect of the invention, the complex inorganic crystals that are surrounded by or incorporated within the amorphous matrix to form the mineral layer can also be characterized by the following formula:

$$Mx\ (Si2O7)_A(SiO3)_B(Si4O11)_C(Si4O10)D(OH)_S{}^*nH2O$$

wherein Mx is one or more imetals supplied by the previously described substradte and x ranges from 1 to 5; A+B+C+D=1 wherein A, B, C and D can each individually equal zero but cannot simulataneosly be zero; n is the water of hydration and ranges from 0 to 10 and typically ranges from 0 to 6; and "s" is an integer that ranges from about 0 to about 4.

In another aspect of the invention, at least a portion of the crystalline component of the mineral layer that is surrounded or incorporated within the amorphous phase comprises:

$$M_xM'_yM''_z(SiO_4)_t(Si2O7)u(OH)2(A)_w(A')_v\text{-}nH_2O$$

where M, M', and M" are ions of Group I, II and/or III metals, and A and A' are the previously defined anions and where x, y, and z each can be any number including zero but x, y and z cannot all concurrently be zero. Analogously, t, u, v, w and x can each be any number including zero but cannot all concurrently be zero. "n" is the water of hydration and normally ranges from about 0 to about 10. At least one of M, M' and M" is a metal supplied from the substrate in contact with the mineralized layer, and normally up to two of M, M' or M" corresponds to an alkali or alkaline earth metal, e.g., calcium, potassium, sodium and mixtures thereof. For example, when the metal substrate comprises zinc and a preceursor comprises sodium silicate the crystalline component, which is embedded within the amorphous matrix to form the mineralized layer, comprises $Zn_xNa_yMz(SiO4)_t(Si2O7)_u(OH)_2{}^*nH_2O$.

In a further aspect of the invention, at least a portion of the crystalline component of the mineral layer that is surrounded or incorporated within the amorphous phase comprises:

$M_xM'_yM''_z(Si2O7)_A(SiO3)_B(Si_4O11)_C(Si4O10)\ _D(OH)s$ $(A)_w(A')_v\text{-}nH_2O$ where M, M', and M" are ions of Group I, II and/or III metals, and A and A' are the previously defined anions and where v, w, x, y, and z each can be any number including zero but x, y and z cannot all concunently be zero. Analogously, A, B, C and D can each be any number including zero but cannot all concurrently be zero. "n" is the water of hydration and normally ranges from about 0 to about 10; and typically, ranges from about 0 to 6. "S" is an integer that ranges from about 0 to about 4. At least one of M, M' and M" is a metal supplied from the substrate in contact with the mineralized layers, and normally up to two of M, M' or M" corresponds to an alkali or alkaline earth metal, e.g., calcium, potassium, sodiumn and mixtures thereof. Without wishing to be bound by aly theory or explanation, it is believed that the presence of alkali cations, e.g., M", can influence the presence of other metal ions, e.g., M' supplied from the metal substrate, by an exchange or a replacement mechanism. For example, when the metal substrate comprises zinc and a precursor comprises sodium silicate the crystalline component, which is embedded within the amorphous matrix to form the mineralized layer, comprises $Zn_xNa_yMz(Si2O7)_A(OH)_S{}^*nH_2O$. More details regarding the mineral formed between the paint and metal surface can be found in the aforementioned copending and commonly assigned patents and patent applications; already incorporated by reference. The mineral coated metal surface can thereafter be further processed in accordance with conventional methods.

The instant invention also relates to improving the following five (V) types of paint and coating formulations. The improvement is achieved for water borne paint systems by adding greater than 0 to about 10 wt. %, and normally up to about 6 wt. %, of a suitable silicate to the formulation. For solvent borne paint systems, the improvement is achieved by adding greater than 0 up to about 15 wt. % of a suitable silicate to the formulation. Examples of suitable silicates include solid and liquid alkali silicates such as sodium silicate, potassium silicate, calcium silicate, among others. Aqueous sodium silicate is particularly effective for water borne paint formulations and systems whereas solid sodium silicate particles are normally employed for use in solvent paint formulations and systems.

While the silicate can be introduced into these paint formulations for best results, the silicate is introduced at any expedite point during paint formulating. Depending upon the characteristics of the paint formulation, desirable results are obtained by adding at least one acidic material or precursor thereof that reduces the pH of the silicate. Examples of suitable acidic materials comprise at least one member selected from the group consisting of hydrochloric acid, sulfuric acid, mixtures thereof, among others. Normally, the amount of an acidic material is effective to lower the pH of the overall paint formulation thereby minimizing any adverse affects, e.g, incompatibility, between the paint formulation and the silicate.

The following five types of paint systems are illustrative of the paints and coatings which can be improved in accordance with the instant invention.

I. ACRYLICS

Acrylics are polymers derived from the homopolymerization of acrylic and/or methacrylic acids and/or their esters, typically provided in either solvent based vehicles (aromatics, esters, ketones) or in water based formulations. The water based formulations may be either of the latex variety (dispersion) or water reducible, wherein a solubilized resin produced by neutralization with appropriate amines prior to introduction of water. The latter type acrylics are, in face, thermoplastic resins which may be employed directly as varnishes, or may utilized in conjunction with amine and amide hardeners to produce thermosets.

Acrylics have the important advantage of having the highest light stability of the various commodity resins used for coatings applications. The only exception are polycarbonate derived materials which find most of their uses in glazing, and they rarely are employed as thermosets. The amount of silicate, e.g., sodium silicate added to acrylic formulations is normally about 1 to about 10 wt. %.

II. ALKYDS

Alkyds are polyesters formed by repeated esterification reactions (polycondensation) between polyhydric alcohols and di- or polybasic carboxylic acids (or their anhydrides). In the overwhelming majority of cases, fatty acids or fatty-acid glycerides are co-esterified with the above mentioned components.

Glycerol is the most commonly used polyol, and phthalic anhydride the usual dibasic acid component. If glycerol is esterified solely with a dibasic acid, heat convertible, rather brittle resins are obtained, which are of little use in the coatings industry as they are insoluble in the commonly used solvents. Such solubility may be obtained by incorporating as a third component a monobasic carboxylic acid with a long hydrocarbon chain, i.e. a higher fatty acid.

Alkyds may be roughly classified into three main types, which in the case of glycerol/phthalic alkyds may be defined as follows: 1) long oil alkyds having an oil length of (fatty acid content) more than 60%, 2) medium oil alkyds, having an oil length between 40% and 60%, and 3) short oil alkyds, having an oil length of less than 40%. The short oil alkyds are mainly used as binders in baked finishes, while the medium and long oil types find use in air-drying coatings. As in the case of polyesters, baked alkyds are cured typically via condensation with nitrogenous hardeners such as urea, melamine or polyamides. The amount of silicate, e.g., sodium silicate added to alkyd formulations is normally about 1 to about 10 wt. %.

III. EPOXY

Epoxy resins are cross-linked into thermosets with various hardening agents. The desired end composit properties are obtained by selecting the appropriate combination of resin and hardener. Pigments, fillers, reinforcements, reactive diluents, modifiers and plasticizers may also be employed. Hardeners-epoxy hardeners function by a condensation or catalytic cure mechanism and fall into the following categories: 1) primary and secondary amines and their adducts, 2) aliphatic polyamines, 3) aromatic polyamines, 4) anhydrides, 5) polyamides, and 6) catalytic curing agents. The amount of silicate, e.g, sodium silicate, added to the epoxy formulations is normally about 1 to about 10 wt. %.

IV. POLYESTER

Polyesters may be considered solutions of condensation products derived form dibasic acids and glycols in a styrenic monomer solvent. Polyester Compounds—In addition to the polyester polymer and styrene monomer components essential to the formulation, many polyesters contain an variety of performance modifiers such as; silicone mode release surfactants and/or coupling agents for surface modification; cure accelerators in the form of heavy metals such as cobalt salts; and flow modifiers such as fumed silica, organic amine treated clays, volatile solvents and the like. Also, polyesters sometimes contain moderate amounts of short chain hydrocarbon rubbers as impact modifiers. Systems intended for glass bonding will usually have modest amounts of isocyanate monomers included for purposes of dehydration of the glass for improved wetting characteristics. Polyester Types—Polyesters may be divided into two general types—thermoplastic (Saturated) Polyester and Unsaturated (Thermoset) Polyester. Thermoplastic (Saturated) Polyester—A thermoplastic Polyester is essentially a low molecular weight saturated thermoplastic polymer solute in a styrene monomer solvent.

Thermoplastic (Saturated) Polyester—Coating—Saturated polyesters are also employed in coatings. These consist primarily of thermoplastic polyesters derived from the condensation of glycols with dibasic acids—specifically, phthalic and isophthalic acids—in solvents such as ketones and aromatics. These saturated polyesters are cured typically via condensation with nitrogenous hardeners such as urea, melamine or polyamides.

The amount of silicate, e.g., sodium silicate added to polyester formulations is normally about 1 to about 10 wt. %.

V. URETHANE

Polyurethanes represent the most complex and variegated polymer systems in widespread commercial use. Polyurethane systems have been developed which exhibit thermoplastic, thermoset, and/or surface moisture cured properties, depending upon composition (polyol, isocyanate, catalyst, etc.), stoichiometry and the nature of external additives. The fundamental chemistry of polyurethanes involves the reaction of di- or polyhydroxyl terminated monomers/oligomers which may be represented by $A_n(OH)_m$ with stoichiometric or near stoichiometric proportions of di-or polyisocyanate terminated monomers/oligomers which may be represented by $B_x(NCO)_y$ to form polymeric products. Commercial urethane formulations often contain substantial proportions of plasticizers, antioxidants, pigments, extenders, reinforcement/fillers, and other additives in order to provide desired finished product properties. The amount of silicate, e.g., sodium silicate added to urethane formulations is normally about 1 to about 10 wt. %

The aforementioned silicate containing paint formulations can be employed in a virtually unlimited array of applications commensurate with conventional paint applications. Such applications include but are not limited to automotive undercoats/midcoats/topcoats for components, panels, facie, among other painted articles; industrial applications such as chemical and petroleum processing facilities; bridges; shipping and marine applications, among other applications known to those skilled in this art.

The following examples are provided to illustrate not limited the scope of the invention as defined in the appended claims. Unless indicated to the contrary, the materials employed in these Examples are commercially available.

EXAMPLE 1

A electrozinc galvanized panel (ACT Labs) was prepared with the following pretreatment:
1. Immerse panel in solution of 25% Metalprep 79 (Parker-Amchem) for 2 minutes,
2. Remove Panel and rinse with deionized water,
3. Scrub panel gently with "Kim-Wipe",
4. Rinse with deionized water and wipe off excess with Kim-wipe,
5. Immerse panel in 0.1 M NaOH solution for 10 sec.,
6. Wipe off excess with Kim-wipe,
7. Immerse panel in 50% H202 solution for 5 min.; and,
8. Wipe off excess with Kim-wipe.

The pretreated panel was then coated with two layers of the following formula (by wt %):

1.0% N-grade Sodium Silicate,
18.5% Water (Fisher Scientific); and,
80.5% NeoRezR-9637 (Zeneca Resins).

Each formula was mixed by hand for approximately 10 minutes. Each layer was applied at a 1.2 mil wet film thickness and given a 15 minute 60 C cure to allow for a tack-free finish. The panels were allowed to set for 24 hours and the coating was physically removed by hand.

The coated galvanized panels were recovered and analyzed in accordance with conventional ESCA methods. ESCA analysis was performed on both panels. ESCA analysis detects the interaction between the coating and the metal substrate and confirms formation of the previously described mineral layer upon the substrate. A first panel shows the Si(2p) photoelectron binding energy of 102.1 eV representing a zinc disilicate species. A second panel also shows the same binding energy at 102.1 eV also indicating the presence of a zinc disilicate species on the surface of the zinc. The second test panel also has significantly more silica on the surface, represented by the 103.3 eV binding energy than does the first panel. Because of the accumulation of silica on the surface of panel #2, the relative amount of zinc decreases due to the limited sampling depth of XPS. The Zn:Si ratio goes down from 2.0 to 0.43 on panel #1 to panel #2, respectively, as would be expected when the build up of silica increases on the panel surface. In both cases, the formation of a zinc disilicate protective species was detected.

EXAMPLE 2

This example demonstrates adding a silicate to an acrylic formula.

The following Table lists the ingredients that were used to prepare a silicate containing acrylic formula. The ingredients of Part III was mixed by hand with a spatula. The ingredients of Part II were also mixed by hand in a separate container with a spatula. Part I was added to Part II and blended by hand to form an admixture. Part III was added to the admixture and blended by hand with a spatula. The mixture was ground with a 1.2 mm Q-beads (Quackenbush) for one hour to a fineness of 0.25 mils. Part IV was added to the mixture with a spatula. Part V was added at the end.

TABLE

| Part I | Carboset XLII | BF Goodrich | 158.88 g |
| Part II Pre-mix | Glycol Ether | Fisher | 19.97 g |
| | water | | 1.6 g |
| Part III | water | | 8.11 g |
| | Surfynol CT-324 | Air Products | 1.67 g |
| | Surfynol 420 | Air Products | 0.47 g |
| | Surfynol DF-37 | Air Products | 0.21 g |
| | TiPure 706 | Dupont | 43.77 g |
| | Ngrade Na$_2$SiO$_3$ | PQ Corp | 4.8 g |
| Part IV | Surfynol DF-37 | Air Products | 0.09 g |
| | Carbo Flow 32W | BF Goodrich | 0.5 g |
| Part V | adjust viscosity with water | | 0.55 g |
| | Total | | 245.34 g |

EXAMPLE 3

This example demonstrates adding a silicate to a silicone formula. The following Table lists the ingredients that were used to prepare a silicate containing silicone formula. All the ingredients were mixed together in the order shown in the Table while stirring with a spatula. After all the ingredients were admixed together, the admixture was ground by using 1.2 mm Q-beads (Quanckenbush) for 2 hours. The paint had a final fineness of 0.5 mils

TABLE

| N Grade Na$_2$SiO$_3$ | PQ Corp | 8 g | |
| D.I. H$_2$O | | 80 g | mix well |
| 36% Hydrochloric Acid | | 2.75 g | add while mixing |
| N Grade Na$_2$SiO$_3$ | PQ Corp | 88 g | mix well |
| TiPure 706 | DuPont | 32.2 g | mix well with spatula |
| SM 2059 | G.E. | 21.1 g | mix well |
| SM 8843 | G.E. | 4.6 g | mix well |
| Surfynol 420 | Air Products | .5 g | mix well |
| Surfynol CT 324 | Air Products | 1.7 g | mix well |
| Total | | 238.85 g | |

EXAMPLE 4

This example demonstrates adding a silicate to an epoxy formula. The following Table lists the ingredients that were used to prepare a silicate containing epoxy formula. Both Parts I and II were mixed together by hand in separate containers. 90 g of Part I and 20 g of Part II were mixed together with 90 g of DI water. The resulting mixture was placed into a metal beaker with 1.2 mm Q-beads and was ground with an air mixer for 2 hours.

| Part I Epoxy Premix | Epotuf 38-692 | 60.0 g | Reichold |
| | Triethanolamine | 18.0 g | Fisher |
| | Sodium Hydroxide Sol | 30.0 g | Fisher |
| | Total | 108.0 g | |
| Part II Silicate/Hydrochloric Acid Solution | N Grade Na$_2$SiO$_3$ | 8.0 g | PQ Corp |
| | DI H$_2$O | 80.0 g | |
| | 36% Hydrochloric Acid | 2.75 g | Fisher |
| | N Grade Na$_2$SiO$_3$ | 88.0 g | PQ Corp |
| | Surfynol 420 | 0.5 g | Air Products |
| | Surfynol CT 324 | 1.7 g | Air Products |
| | Total | 180.95 g | |
| Part III | Mix together for final product | | |
| | Part I Epoxy Pre-mix | 90.0 g | |
| | Part II Silicate/Acid Sol | 20.0 g | |
| | DI H$_2$O | 90.0 g | |
| | Total | 200.0 g | |

The following is claimed:

1. An improved epoxy paint formulation comprising about 1 to about 10 wt. % of at least one silicate, water, and amount of at least one an acidic material or a precursor thereof in an amount effective to reduce the pH of the paint.

2. A paint comprising urethane water, about 1 to about 10 wt. % of at least one silicate, and an amount of at least one of acidic material or a precursor thereof in an amount effective to reduce the pH of the paint.

3. A paint comprising silicone, about 1 to about 10 wt. % of at least one silicate, water, and at least one acidic material or a precursor thereof in an amount effective to reduce the pH of the coating.

4. The paint of claim 1 wherein said at least one silicate comprises at least one member selected from the group consisting of sodium silicate, potassium silicate and calcium silicate.

5. The paint of claim 1 wherein said at least one acidic material or a precursor thereof comprises at least one member selected from the group consisting of hydrochloric acid, and sulfuric acid.

6. The paint of claim 4 wherein the silicate conprises sodium silicate.

7. The paint of claim 5 wherein said at least one acidic material or a precursor thereof comprises hydrochloric acid.

8. An improved acrylic paint comprising acrylic resin, water, about 1 to about 10 wt. % of at least one silicate, at least one acidic material or a precursor thereof in an amount effective to reduce the pH of the paint.

9. A corrosion resistant paint formulation for a metal surface comprising a combination of at least one member selected from the group consisting of an acrylic, epoxy, urethane and a silicone; water, at least one silicate selected from the group consisting of calcium silicate, potassium silicate and sodium silicate; and at least one member selected from the group consisting of hydrochloric acid and sulfuric acid; and wherein said at least one silicate reacts with the metal surface to form a mineralized layer comprising inorganic oxide crystals within an amorphous matrix.

10. The paint of claim 2 wherein said at least one silicate comprises at least one member selected from the group consisting of sodium silicate, potassium silicate and calcium silicate.

11. The paint of claim 2 wherein said at least one acidic material or a precursor thereof comprises at least one member selected from the group consisting of hydrochloric acid, and sulfuric acid.

12. The paint of claim 3 wherein said at least one silicate comprises at least one member selected from the group consisting of sodium silicate, potassium silicate and calcium silicate.

13. The paint of claim 3 wherein said at least one acidic material or a precursor thereof comprises at least one member selected from the group consisting of hydrochloric acid, and sulfuric acid.

14. The paint of claim 8 wherein said at least one silicate comprises at least one member selected from the group consisting of sodium silicate, potassium silicate and calcium silicate.

15. The paint of claim 8 wherein said at least one acidic material or a precursor thereof comprises at least one member selected from the group consisting of hydrochloric acid, and sulfuric acid.

16. The paint of claim 6 wherein the silicate comprises sodium silicate.

17. The paint of claim 7 wherein the acidic material comprises hydrochloric acid.

18. The paint of claim 10 wherein the silicate comprises sodium silicate.

19. The paint or claim 11 wherein the acidic material comprises hydrochloric acid.

20. The paint of claim 12 wherein the silicate comprises sodium silicate.

21. The paint of claim 13 wherein the acidic material comprises hydrochloric acid.

22. The paint of claim 14 wherein the silicate comprises sodium silicate.

23. The paint of claim 15 wherein the acidic material comprises hydrochloric acid.

* * * * *